Jan. 15, 1952     O. I. A. KÅGEFORS     2,582,782
DEVICE FOR CLINCHING NAILS

Filed Oct. 21, 1950                               4 Sheets-Sheet 4

INVENTOR
Oskar Ivar Albin Kågefors
BY Rowland V. Patrick
             ATTORNEY

Patented Jan. 15, 1952

2,582,782

UNITED STATES PATENT OFFICE 2,582,782

DEVICE FOR CLINCHING NAILS

Oskar Ivar Albin Kågefors, Landsbro, Sweden, assignor to Hyresgästernas Sparkasse- och Byggnadsföreningars Riksförbund u. p. a., Stockholm, Sweden, a corporation of Sweden Application October 21, 1950, Serial No. 191,411
In Sweden June 5, 1950

10 Claims. (Cl. 1—1)

U. S. specification 2,497,737 describes a method for nailing up two or more wooden parts or the like, and according to this method two or more holes or apertures are first bored or formed in one of the wooden parts transversely to the nailing direction at such a distance from the surface of the wooden part, that the free end or ends of one or more of the nails nailed into the wood from the other wooden part will project into the hole or aperture, whereupon said nail end or ends are clinched by means of a tool introduced longitudinally into the hole or aperture. This method has been used to a great extent in the production of so-called pallets with two rails or bars, connecting the upper loading plane of the pallet and its lower supporting base at least at two opposite sides. Said holes or apertures are made in said bars.

The main object of the present invention is to provide a machine for executing said clinching.

A further object of the invention is to provide, for said purpose, at least two mandrel-like tools, reciprocating approximately synchronously and driven from a mutual driving mechanism, so that they will be approximately simultaneously introduced each into one of said holes of said wooden parts.

The invention also aims at effecting the clinching rapidly and providing means for balancing the laterally acting forces on the work-piece arising from the clinching so as to retain the work-piece at its place during the working.

A still further object of the invention is to provide a feeding device for advancing the work-piece during the clinching.

Figure 1:
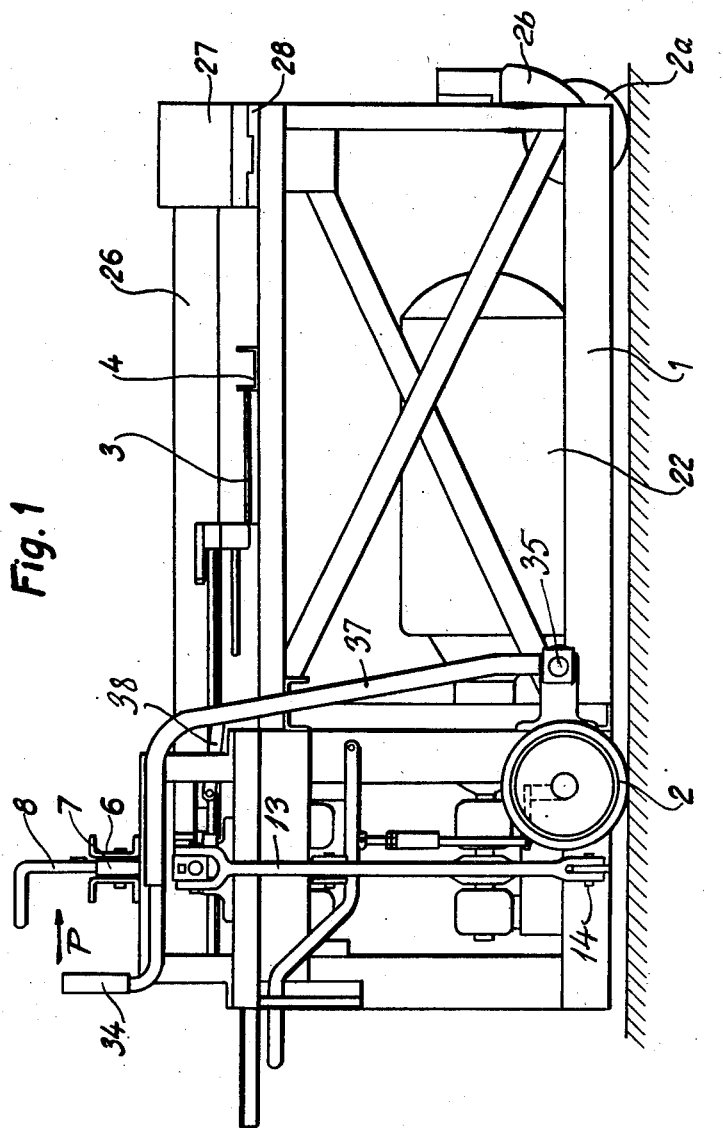
Figure 2:
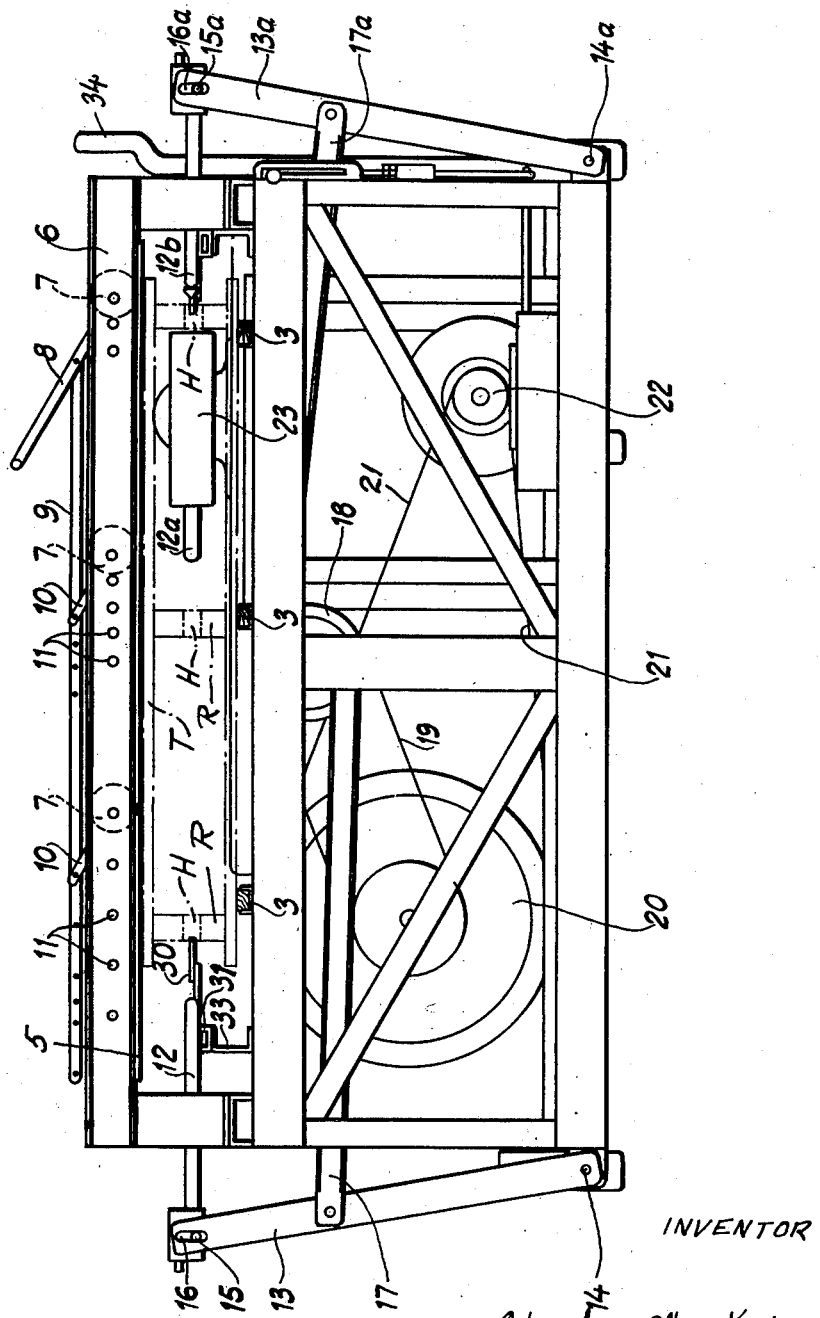
Figure 3:
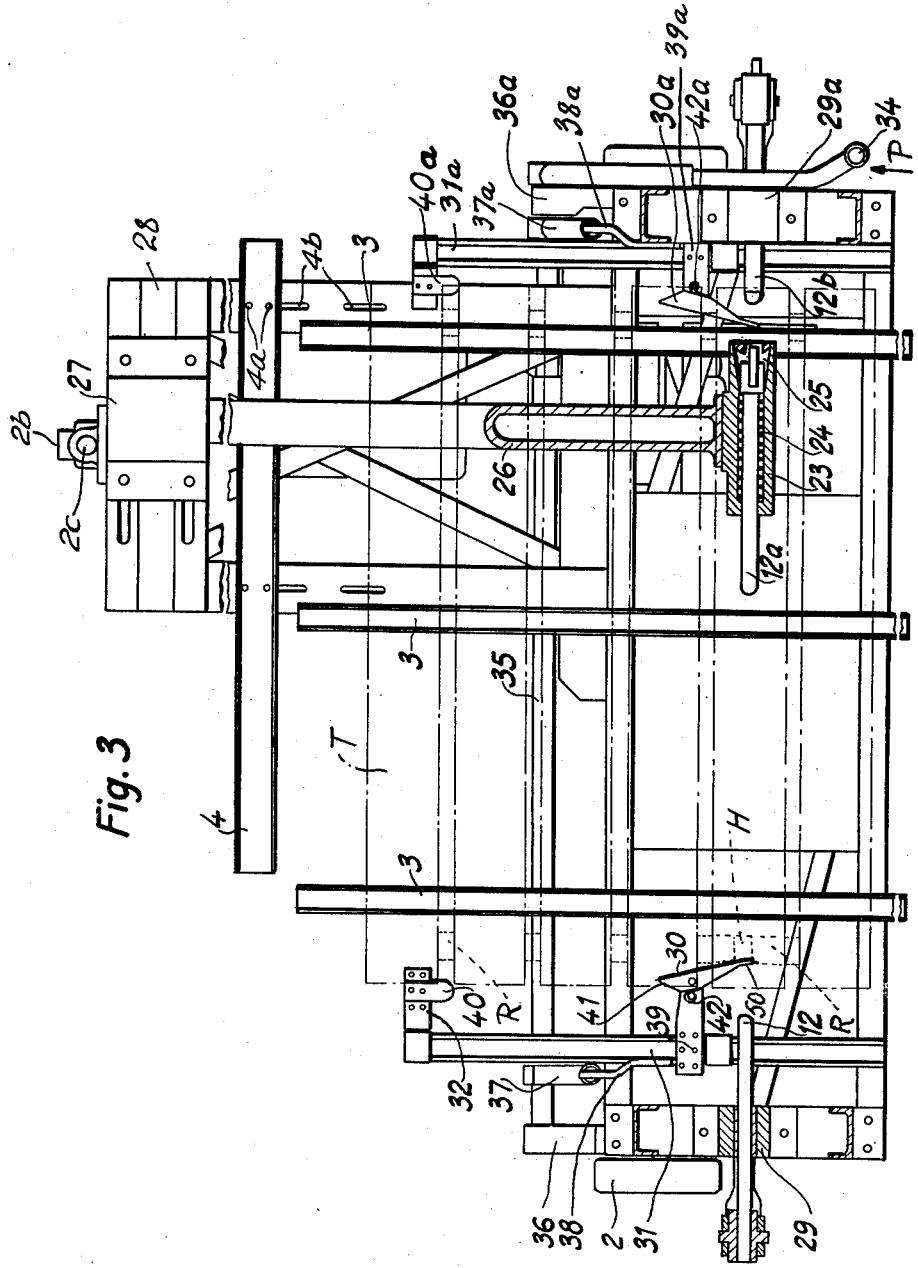
Figure 4:
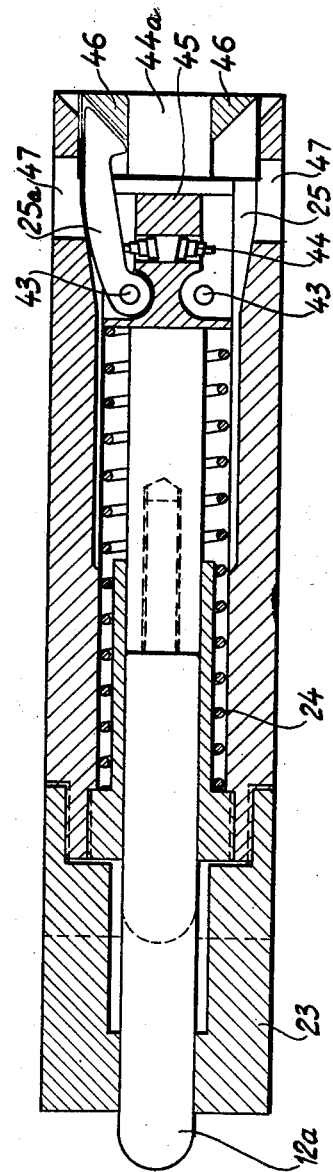

Other objects and features of the invention will be clear from the following description of one embodiment thereof, illustrated on the accompanying drawings, in which:

Fig. 1 is an end-elevation of the machine,
Fig. 2 a side-elevation thereof,
Fig. 3 a plan view partly in section, and
Fig. 4 a longitudinal section of a clinching mandrel on a larger scale.

The machine substantially consists of a stand or frame 1, which may have wheels 2, 2a, the latter one preferably being pivoted on a support 2b, which is rotatable about a vertical axis 2c. At the top side of the frame 1, a plurality of rails with bars 3 are suitably spaced for carrying the work-piece to be worked in the machine, in this case a pallet T (shown in Figs. 2 and 3 in dot and dash lines). The pallet is pushed in until its rear edge thrusts against a transverse bar 4. In similarity with the bars 3 this bar 4 may be adjustably mounted in the frame by means of screws 4a and slots 4b. Above the frame proper a pair of beams 6 are anchored to the frame, and between said beams there is pivotally mounted a plurality of rotatable eccentrics 7, adapted, if desired, by means of intermediate spacers 5, to be pressed against the top side of the pallet T, thus holding and clamping the pallet. Each of the eccentrics is adapted to be rotated by its own lever 10 (Fig. 2). All levers are connected by a bar 9, adapted to be operated by means of a common lever 8, so as to force all eccentrics into or out from their clamping positions. For facilitating working of pallets or other objects of different dimensions a plurality of pivot holes 11 may be arranged in the beams 6 for the pivot shafts of the eccentrics 7, so that the eccentrics may be moved from one hole to another.

In the example shown in the drawing the pallet T is provided with three parallel spaced bars R between its upper and lower decks (loading plane and supporting plane respectively), and said bars R have rows of aligned transverse borings H to enable clinching of the nails forced into the wood from the said board planes into the bars R opposite to the borings as described in U. S. specification 2,497,737. The clinching operation is effected by mandrel-like tools adapted to enter the borings H, so as to clinch the nail ends. In order to clinch the nails simultaneously in each aligned row of three borings H in the three bars R, the machine is provided with three mandrels 12, 12a, 12b in the example shown. The two external mandrels 12, 12b are adapted to clinch the nails of the borings H in the external bars, while the middle mandrel 12a is adapted to clinch the nails of the middle bar R. For effecting the clinching operation all the three mandrels are adapted to exert a working movement to and fro in relation to the actual boring. To this purpose the mandrels 12, 12b are arranged to slide in bearings 29, 29a in the frame 1 and their outer ends are connected to a link 13, 13a by means of a pin and slot connection 15, 16 and 15a, 16a respectively. The lower end of the link 13, 13a is pivoted on a fulcrum 14, 14a and the middle part thereof is articulated to a connecting rod 17, 17a. The ends of the connecting rods are connected to diametrically opposed points of a rotating wheel 18 actuated by a wheel 20 and a belt 19. In its turn the wheel 20 is driven by a motor 22 by means of a belt 21 or like.

On rotation of the wheel 18 the mandrels 12, 12b will effect a reciprocating movement. The wheel 20 is provided with a coupling, which causes the wheel 18 to be operated during part of its rotation only, while during the remaining part the wheel 20 is idling in a known manner.

Preferably the middle mandrel 12a will be actuated by the mandrel 12b. According to the embodiment illustrated (Figs. 3 and 4) the mandrel 12a slides in a sleeve 23 mounted on a support, e. g. in the form of a tubular cantilever arm 26. One end of this tube is supported by a slide 27, which is adapted to slide in guides 28 for adjusting the space between the mandrels 12a and 12b.

The mandrel 12a is adapted to slide on being actuated by the mandrel 12b, which for this purpose, after entering its boring H, will continue its working stroke and push on the mandrel 12a, so as to cause the latter to enter its boring whereupon both mandrels will return together to the starting position. For this purpose the sleeve 23 is provided with an axial channel 44a (Fig. 4), which the nose or point of the mandrel 12b may enter. According to Fig. 2 this nose or point is provided with a head. On entering the channel 44a the head will engage a projection 45, mounted on an extension of the mandrel 12a, so that the latter will follow the sliding movement of the mandrel 12b against the action of a spring 24. The mandrel 12a having completed its clinching operation, both mandrels are returned. The mandrels are positively interconnected by means of a hook 25a, pivoted on fulcrums 43 and mounted at the projection 45, said hooks engaging the head of the mandrel 12b during the return motion. When this head approaches the channel 44a it is necessary to disengage both mandrels and it is effected by means of a spring 44 acting on the hooks 25a so as to force them outward. This outward movement is prevented during the returning motion of the mandrel until the hooks enter a widened chamber 25 in the sleeve near the channel 44a. In order to secure disengagement of the hooks 25a from the mandrels 12b, the hooks will slip over sloping abutments 46 at the channel 44a on completing their outward movement. The chamber 25 may be accessible from outside through lateral ports 47.

After clinching the nails in the opposed borings H by means of the mechanism now described, the pallet T must be moved forward in order to cause the next series of borings to register the mandrels. This movement will be accomplished by operating a lever 34 (Fig. 1) mounted on a shaft 35 at the lower side of the frame and, pivoted at 36, 36a (Fig. 3). Each end of the shaft 35 carries arms 37, 37a adapted to operate links 38, 38a, engaging holders, which slide on rails 31, 31a, hook formed catching means 30, 30a, being pivoted to the holders. The rails 31, 31a are mounted on beams 33 (Fig. 2) in the frame. Two springs 42 and 43 are provided to press the catching means 30 and 30a against the sides of the work piece to be worked in the machine. Thus, the distance between said catching means is automatically adjusted to fit the size of said work piece. On moving the lever 34 in the direction of the arrow P (Figs. 1 and 3) the catching means 30, 30a are caused by means of the link-and-arm mechanism just described, to move in the same direction so as to drag on the outer side of the bar R in question until the points 50 of the catching means engage the borings H. Now the lever 34 is moved in the opposite direction so as to take the pallet T with itself (it is assumed that the clamping pressure, exerted by the eccentrics 7, first is released to allow said motion) until said borings are brought in registering position in front of the mandrels 12, 12a, 12b. By means of the lever 34 the catching means now are moved out of their borings so that they do not prevent the mandrels in their working. Naturally the catching means may be caused to engage another pair of borings than that one to be worked. In order not to prevent inserting of pallet in the machine, the catching means may be swung into non-operative positions at the beginning of the operation of the machine, for instance by moving their slanting edge 41 against stops 40, 40a, mounted on fittings 32, 32a.

The feeding device now being described is connected to the coupling of the wheel 20 in such manner, that said coupling is actuated and the mandrels get their moving impulse just as the feeding movement is completed.

The invention is not limited to the use for clinching pallets. Further, the details of the machine may be varied in several ways without departing from the invention.

What I claim is:

1. In a device for clinching nails in joined wooden parts, wherein the free ends of the nails project into holes formed in one of the parts, a support, a first mandrel-like tool mounted on said support for movement into and out of one of such holes of said wooden parts resting on said support, a second mandrel-like tool mounted on said support in the path of movement of said first mandrel-like tool for movement by said first tool after the first tool has pierced one hole to cause said second tool to enter a further hole in said wooden parts to clinch nail ends therein.

2. In a device for clinching nails in joined wooden parts according to claim 1, connecting means for positively interconnecting said first mandrel-like tool and said second mandrel-like tool during part of the movement thereof.

3. In a device for clinching nails in joined wooden parts according to claim 1, connecting means for positively interconnecting said first mandrel-like tool and said second mandrel-like tool during part of the movement thereof comprising a head, projecting from the front end of said first mandrel-like tool and a hook member pivotally mounted at the rear end of said second mandrel-like tool for engaging said head of said first mandrel-like tool, and disconnecting means for disconnecting said hook member from said head when said second mandrel-like tool has returned to its rest position, said disconnecting means comprising a tapered abutment for engaging a tapered surface of the rear end of said hook member, said abutment being mounted at one end of a guide for said second mandrel-like tool.

4. In a device for clinching nails in joined wooden parts wherein the free ends of the nails project into holes formed in one of the parts, a support, a first mandrel-like tool mounted on said support for movement into and out of one of such holes of said wooden parts resting on said support, a second mandrel-like tool mounted on said support in the path of movement of said first mandrel-like tool for movement by said first tool after the first tool has pierced one hole to cause said second tool to enter a further hole in said wooden parts to clinch nail ends therein, connecting means for positively interconnecting said first mandrel-like tool and said second mandrel-like tool during part of the movement thereof, comprising a head, projecting from the front end of said first mandrel-like tool and a hook member pivotally mounted at the rear end of said second mandrel-like tool for engaging said head of said first mandrel-like tool, and disconnecting means for disconnecting said hook member from said head when said second mandrel-like tool has returned to its rest position, said disconnecting means comprising a tapered abutment for engaging a tapered surface of the rear end of said hook member, said abutment being mounted at one end of a guide for said second mandrel-like tool, a circular sleeve for guiding said second mandrel-like tool, said sleeve having a wider inner diameter at its rear end for the purpose of allowing said hook member to be disengaged from said head of said first mandrel-like tool when said second mandrel-like tool is in its rest position, while the inner diameter of the remaining portion of said sleeve is chosen so as to force said hook member into connecting position by the inner wall of said sleeve, while said second mandrel-like tool is moved forwardly from its rest position.

5. In a device for clinching nails in joined wooden parts, wherein the free ends of the nails project into holes formed in one of the parts, a support, a first mandrel-like tool mounted on said support for movement into and out of one such hole of the wooden parts resting on said support, a second mandrel-like tool mounted on said support for movement into and out of another such hole, common means for driving said tools to clinch said nail ends in the respective holes, and a third mandrel-like tool mounted on said support in the path of movement of one of said two tools for movement by said one tool after the latter has pierced one hole to cause said third tool to enter a further hole in said wooden parts to clinch nail ends therein.

6. Apparatus for clinching nail ends which project into transverse holes formed in spaced supporting members which separate the upper and lower decks of a pallet, comprising a support for holding a pallet, a first mandrel-like tool mounted on said support for movement into and out of a hole in one of the supporting members of a pallet positioned on said support to clinch nail ends which project into said hole, a cantilever arm extending over said support in parallel spaced relation thereto and generally normal to the path of movement of said first mandrel-like tool, a second mandrel-like tool mounted on said arm and adapted to be moved into and out of a hole in another supporting member of the pallet to clinch nail ends which project into said second hole, whereby a pallet may be positioned on said support with said second tool disposed between its decks and between two of said supporting members, and driving means for moving said two tools, respectively, into the said two holes of the positioned pallet to clinch nail ends projecting into said holes.

7. Apparatus as claimed in claim 6, wherein the driving means moves said two tools in the same direction into said two holes.

8. Apparatus for clinching nail ends which project into transverse aligned holes formed in spaced supporting members which separate the upper and lower decks of a pallet, comprising a support for holding a pallet, a first mandrel-like tool mounted on said support for movement into and out of one of said aligned holes in a pallet positioned on said support to clinch nail ends which project into said one hole, a cantilever arm extending over said support in parallel spaced relation thereto and generally normal to the path of movement of said first mandrel-like tool, a second mandrel-like tool mounted on said arm in the path of movement of said first tool and adapted to be moved by said first tool into and out of a second aligned hole in the supported pallet, whereby a pallet may be positioned on said support with said second tool disposed between its decks and between two aligned holes in said supporting members, and said first tool being adapted after it has pierced the said first hole to move said second tool into the second aligned hole to clinch nail points projecting into said second hole.

9. In a device for clinching nails in joined wooden parts wherein the free ends of the nails project into spaced holes formed in one of the parts, a support, a mandrel-like tool mounted on said support for movement to and fro, and means on said support for receiving said nailed wooden parts including mechanism for feeding said parts a distance corresponding to the spacing between said holes for successively moving said holes into the path of reciprocation of said tool.

10. A device as claimed in claim 9, wherein the feeding mechanism includes latches adapted to engage the holes in the wooden parts.

OSKAR IVAR ALBIN KÅGEFORS.

REFERENCES CITED

The following references are of record in the file of this patent:

UNITED STATES PATENTS

| Number | Name | Date |
|---|---|---|
| 210,088 | Brightman | Nov. 19, 1878 |